United States Patent
Gregory et al.

(10) Patent No.: US 12,455,891 B2
(45) Date of Patent: Oct. 28, 2025

(54) MULTI-CONSUMER VERSIONING SYSTEM FOR RETRIEVING LISTS OF CHANGED OBJECTS

(71) Applicant: Hewlett Packard Enterprise Development LP, Spring, TX (US)

(72) Inventors: James Gregory, Bristol (GB); Lorenzo Fabbri, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 35 days.

(21) Appl. No.: 18/505,829

(22) Filed: Nov. 9, 2023

(65) Prior Publication Data
US 2025/0156432 A1    May 15, 2025

(51) Int. Cl.
*G06F 16/2458* (2019.01)
*G06F 16/2455* (2019.01)
*G06F 16/2457* (2019.01)

(52) U.S. Cl.
CPC .... *G06F 16/2474* (2019.01); *G06F 16/24552* (2019.01); *G06F 16/24573* (2019.01)

(58) Field of Classification Search
None
See application file for complete search history.

(56) References Cited

U.S. PATENT DOCUMENTS

| | | | | |
|---|---|---|---|---|
| 9,384,511 | B1* | 7/2016 | Purpus | G06F 16/2358 |
| 10,002,247 | B2* | 6/2018 | Suarez | G06F 21/31 |
| 10,929,393 | B2* | 2/2021 | Das | G06F 16/22 |
| 11,397,750 | B1* | 7/2022 | Lekakis | G06F 16/275 |
| 11,494,394 | B2* | 11/2022 | Bui | G06F 16/2474 |
| 11,941,014 | B1* | 3/2024 | Das | G06F 16/219 |
| 2010/0111108 | A1* | 5/2010 | Akgul | H04N 21/4384 |
| | | | | 370/474 |
| 2013/0159987 | A1* | 6/2013 | Shi | G06F 9/45558 |
| | | | | 717/170 |
| 2013/0275377 | A1* | 10/2013 | Jaquet | G06F 16/219 |
| | | | | 707/640 |
| 2016/0011896 | A1* | 1/2016 | Khalid | H04L 41/5019 |
| | | | | 718/1 |
| 2016/0132808 | A1* | 5/2016 | To | G06Q 10/06315 |
| | | | | 705/7.25 |
| 2017/0214641 | A1* | 7/2017 | Mishra | G06F 40/166 |

(Continued)

*Primary Examiner* — Khanh B Pham
*Assistant Examiner* — Navneet Gmahl
(74) *Attorney, Agent, or Firm* — Slater Matsil, LLP

(57) ABSTRACT

In certain embodiments, a method includes generating a cache ring corresponding to a resource type and including entries corresponding to objects for resources of the resource type in a cloud infrastructure; receiving a subscription request including a version number; searching the cache ring using the version number; generating, when the version number is in the cache ring, a changed object list including object identifiers corresponding entries in the cache ring having an update entry type or a delete entry type; obtaining, based on the object identifiers in the changed object list, object information for objects corresponding to a portion of the first set of entries that have the update entry type; and transmitting to the user interface the object information for the objects and a notification of deletion of other objects corresponding to a second portion of the first set of entries that have the delete entry type.

20 Claims, 5 Drawing Sheets

(56) References Cited

U.S. PATENT DOCUMENTS

| | | | |
|---|---|---|---|
| 2018/0102934 A1* | 4/2018 | Ly | G06F 9/5061 |
| 2018/0121047 A1* | 5/2018 | Goel | G06F 3/0485 |
| 2018/0316551 A1* | 11/2018 | Subramani Nadar | H04L 41/5054 |
| 2018/0316552 A1* | 11/2018 | Subramani Nadar | H04L 41/5045 |
| 2018/0324174 A1* | 11/2018 | Venkata | H04L 63/0815 |
| 2019/0339967 A1* | 11/2019 | Moondhra | G06F 16/2246 |
| 2021/0049664 A1* | 2/2021 | Lundgaard | G06F 16/90344 |
| 2021/0303413 A1* | 9/2021 | Chopra | G06F 11/1435 |
| 2022/0224776 A1* | 7/2022 | Doshi | G06F 12/0897 |
| 2022/0263920 A1* | 8/2022 | Lyu | H04L 67/55 |
| 2023/0306064 A1* | 9/2023 | Verma | G06F 16/93 |
| 2023/0342179 A1* | 10/2023 | Suttle | H04L 41/0894 |
| 2024/0089341 A1* | 3/2024 | Dey | H04L 63/105 |

* cited by examiner

MULTI-CONSUMER VERSIONING SYSTEM FOR RETRIEVING LISTS OF CHANGED OBJECTS

BACKGROUND

Users of computing resources often desire to view information related to such resources. As an example, users may access a user interface to view information about the resources. However, users may disconnect from such a user interface from time to time for various reasons. When the disconnection time is long enough, information regarding the resources may change. However, it may be inefficient to re-provide all resource-related information each time a user interface re-connects to an entity capable of providing resource-related information.

BRIEF DESCRIPTION OF THE DRAWINGS

Certain embodiments discussed herein will be described with reference to the accompanying drawings listed below. However, the accompanying drawings illustrate only certain aspects or implementations of embodiments described herein by way of example, and are not meant to limit the scope of the claims.

DETAILED DESCRIPTION OF ILLUSTRATIVE EMBODIMENTS

Figure 1:
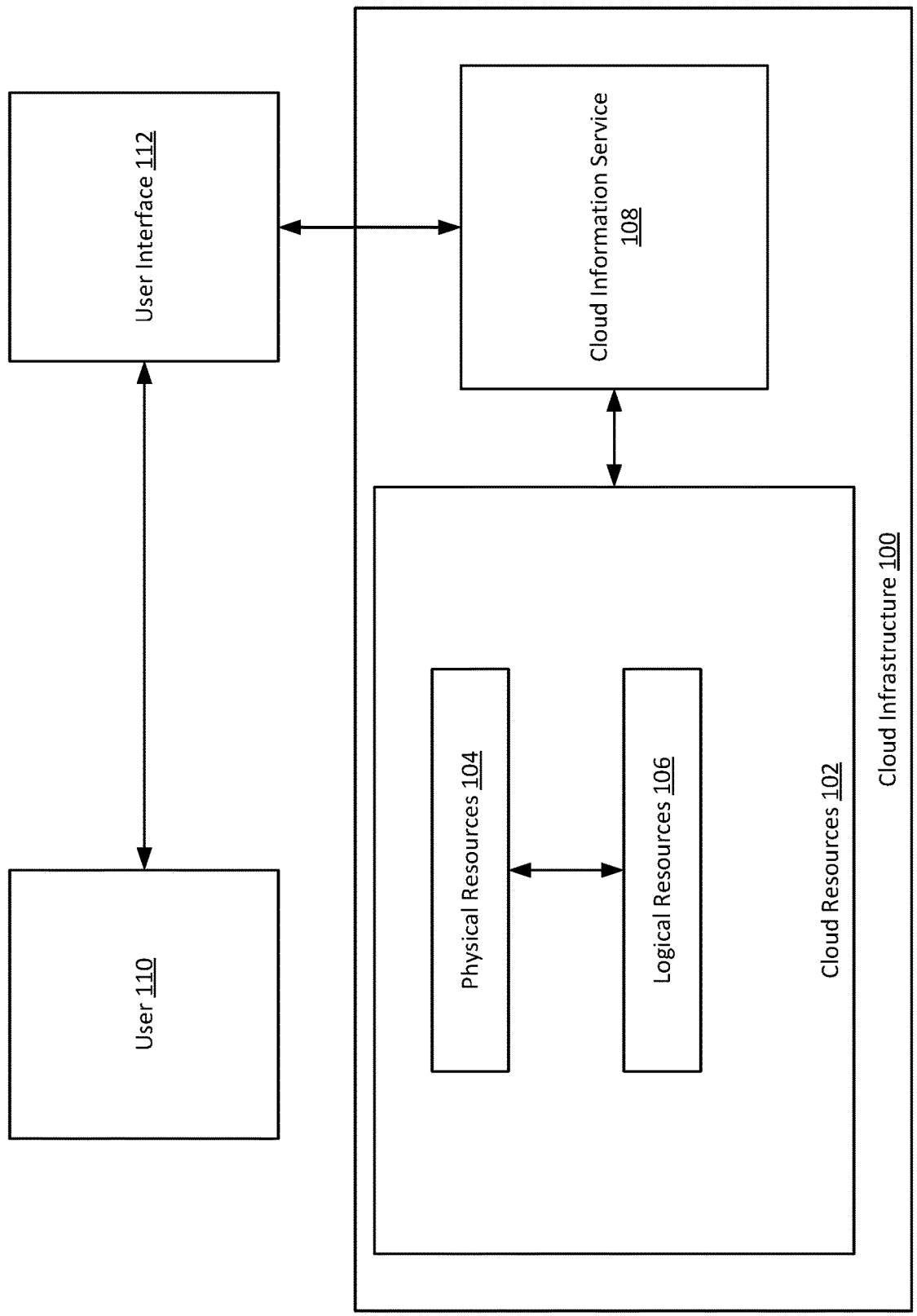
FIG. 1 illustrates a block diagram of an example system for providing cloud infrastructure information to any number of users in accordance with one or more embodiments disclosed herein.

A variety of computing resources (e.g., any physical resources and/or logical resources) may exist in a cloud infrastructure. Examples of such resources include, but are not limited to, servers, network devices, enclosures (e.g., server racks, blade enclosures, etc.), clusters, pods, containers, microservices, virtual machines, buckets (e.g., collections of stored data), etc. that correspond to one or more users of the resources. A given user may access a user interface (e.g., a Data Services Cloud Console) in which the user may view information about the various resources (e.g., the aforementioned physical resources and/or logical resources) that exist in a cloud infrastructure. Any number of users using any number of user interfaces may exist that desire to see information about resources in a particular cloud infrastructure.

However, the amount of information about the resources that correspond to a particular user and about which the user desires to view information may be large. As an example, there may be hundreds, thousands, millions, etc. of resources in a particular cloud infrastructure. Thus, each time a user accesses a user interface, either for a first time or any subsequent time after disconnecting from a previous session (e.g., intentionally, as a result of a connectivity interruption, etc.), all of the information about all of the resources relevant to the user accessing the user interface must be retrieved and provided to the user interface to be displayed to the user. However, transmitting large amounts of information about resources in a cloud infrastructure each time a user connects or reconnects to a cloud information service may be costly, in terms of compute resources, memory resources, network resources, time to transmit, expense, etc.

In order to address at least the aforementioned problems with providing information about resources in a cloud infrastructure to users interested in viewing such information, embodiments disclosed herein provide techniques for reducing the amount of information about the resources that is transmitted to a user, while allowing the information available to the user to remain current relative to the state of the resources of the cloud infrastructure.

In one or more embodiments, when the user initiates (e.g., opens, executes, connects to, etc.) a user interface for viewing information about resources in a cloud infrastructure for the first time, a subscription request may be sent to a cloud information service that is operatively connected to the cloud infrastructure in which the resources exist. Such subscription requests may also occur each time the user interface reconnects to the service (e.g., after a disconnect). A user interface may remain subscribed after a subscription request as long as the user interface remains connected to the cloud information service. As an example, the cloud information service may be implemented on a Kubernetes pod executing in the cloud infrastructure. In response to the subscription request, the cloud information service may access information about the various resources, and provide the information to the user in response to the subscription request, and provide updates for as long as the user interface maintains the connection, and, thus, remains subscribed.

In one or more embodiments, each of the resources in a cloud infrastructure corresponds to a data object that includes information about the resource. As an example, an enclosure may have a firmware version, a certain number of components installed that are each in certain state (e.g., on, off, connected to or disconnected from a network, in a degraded state, etc.), any other relevant information related to the enclosure, etc., and the collection of such information about the enclosure may be considered an object. As another example, an application may be deployed in a Kubernetes container platform as a set of microservices implemented on a number of container pods, and all of the information about that application, or any portion thereof (e.g., the container platform, the microservices, pods, containers, devices on which such things are deployed, etc.), may be considered an object. As another example, a user may have created any number of buckets (e.g., Amazon S3 buckets) for storing information of any type, and information about each of the buckets (e.g., bucket size, space left in bucket, access policy for bucket, etc.) may be considered as objects. Thus, as used herein, an object may refer to metadata about a resource (e.g., an enclosure, a container deployment, a bucket, any physical or logical component, etc.) in a cloud infrastructure. In one or more embodiments, objects may be grouped into resource types. For example, an enclosure resource type may refer to all objects corresponding to enclosures, a container resource type may refer to a collection of objects corresponding to container deployments, a bucket resource type may refer to a collection of objects corresponding to buckets, etc.

In one or more embodiments, a cloud information service is configured to create and maintain a cache ring for each resource type in a cloud infrastructure. There may be any number of cache rings, depending on how many resource types exist in the cloud infrastructure. The following description, for the sake of clarity, will focus on one cache ring for one resource type. However, one of ordinary skill in the art will appreciate that the description of a cache ring applies to any number of cache rings for any number of resource types in a cloud infrastructure, and that a cloud information service may use the various cache rings to provide information to a user interface about any number of resource types.

The cache ring may be implemented in memory (e.g., rather than some form of persistent storage). The cache ring may have entries that are added by the cloud information service as they are received by the cloud information service. The cloud information service may be provided information each time an object corresponding to a resource in the cloud infrastructure is updated. As an example, when the firmware of an enclosure is updated, the object corresponding to the enclosure may be updated to reflect the new firmware version. As another example, when access permissions for a bucket are updated, the object corresponding to the bucket may be updated to reflect the new access policy. As another example, when the number of pods of containers used to implement an application increases, the object corresponding to the container deployment may be updated with the new number of pods. Other updates to the resources may cause updates to corresponding objects without departing from the scope of embodiments disclosed herein. The cloud information service may receive information about object updates using any manner of receiving information. As an example, the cloud information service may receive information about container deployments via a Kubernetes application programming interface (API) providing information based on a custom resource definition (CRD). As another example, various APIs may exist and be configured to provide information about other resources (e.g., buckets, physical devices, logical components, etc.).

In one or more embodiments, each time the cloud information service is notified that an object has been updated, the cloud information service may add an entry to a cache ring corresponding to a resource type to which the updated object belongs. In one or more embodiments, each such update to an object of the resource type to which the cache ring corresponds causes the cloud information service to add an entry to the cache ring, up to the configured maximum size of the cache ring (e.g., hundreds, thousands, millions, etc. of entries). In one or more embodiments, each entry added to a cache ring by the cloud information service includes a unique identifier (e.g., a unique name, a universally unique identifier (UUID), etc.) of the object that was updated, and a version data item. The version data item may include an encoding of the type of entry (discussed below), as well as a representation of the version number for the entry. As an example, the version data item may be a thirty-two bit number, in which the first two bits are used to encode one of four possible entry types and the remaining thirty bits are used to encode the integer value of the version number. In one or more embodiments, each entry added by the cloud information service to a cache ring includes a version number that is increased (e.g., by one) from the previous entry added to the cache ring.

As discussed above, a cache ring corresponds to a resource type, and there may be any number of objects of that resource type (e.g., millions of buckets, each corresponding to separate objects). In one or more embodiments, an update to any object of that resource type causes the cloud information service to add an entry to the appropriate cache ring for the resource type. However, in one or more embodiments, the version number represents a new entry in the cache ring, and does not correspond to any particular object of the resource type. As an example, an update to a first object of a particular resource type may cause the cloud information service to add a first entry to the cache ring with an identifier of the first object and a version data item that includes two bits to represent the update type and the remaining bits to represent version one. The cloud information service may then be notified of an update to a second object of the same resource type. In response, the cloud information service may add a second entry to the cache ring with an identifier of the second object and a version data item that encodes the update type and includes a representation of version two. Thus, even though the objects were not the same object, the version number increased as the second entry was added to the cache ring by the cloud information service, so that the second entry has a higher version number than the first entry.

In one or more embodiments, there are four types of entries. In one or more embodiments, the first type of entry is an update. In one or more embodiments, an update is when the information in an object (e.g., metadata corresponding to a resource in a cloud infrastructure) changes. As an example, when the firmware of a network component of an enclosure changes, the object may be changed to reflect a version number of the new firmware. In one or more embodiments, the second type of entry is a deletion. As an example, a resource may be removed from the cloud infrastructure (e.g., a physical device is removed, a container pod is deleted, a bucket is deleted, etc.), and the object corresponding to that resource is deleted.

In one or more embodiments, the remaining two entry types are separator entries and refresh entries. In one or more embodiments, separator and refresh are entry types used whenever a full refresh is performed. In one or more embodiments, a full refresh (discussed further below) is performed whenever a subscription request is received that requires all objects of a resource type corresponding to a cache ring to be provided to the user interface from which the subscription request was received. In one or more embodiments, a subscription request is received whenever the user interface is accessed by the user so that the user may view information about resources of a cloud infrastructure. As such, a subscription request may be received when a user first uses the user interface and connects to a cloud information service, and also each time a user reconnects to the cloud information service after previously disconnecting from the cloud information service.

An initial subscription request may not include a version number. In one or more embodiments, if a subscription request is received that has no version number, a full refresh is performed. In one or more embodiments, to perform a full refresh, the cloud information service creates a list of all objects of the resource type to which the cache ring corresponds. In one or more embodiments, the list of all objects is a list of objects corresponding to a resource currently present in the cloud infrastructure (e.g., the list does not include objects that were deleted before that full refresh was started). In one or more embodiments, the cloud information service then adds an entry to the cache ring with a separator version type, then entries for all objects of the resource type to which the cache ring corresponds, with each such entry having a refresh entry type, and then another entry with a separator entry type, with the first separator entry, each of the refresh entries, and the second separator entry each having an increasing version number.

In one or more embodiments, the cloud information service then checks to determine whether any updates to any objects have occurred during the time the object list was being created and the separator and refresh entries were being added to the cache ring. However, in other embodiments, the amount of time for performing a full refresh is small, and, thus, the cloud information service may not check for updates that occur during an uninterrupted full refresh. Instead, in one or more embodiments, updates that occur during an uninterrupted full refresh may be processed after completion of the full refresh. In one or more embodiments, if there were no updates that occurred during that time, or in embodiments in which updates are not checked for during uninterrupted full refreshes, the cloud information service sends information corresponding to each refresh entry to the user interface in one or more messages of any type (e.g., data packets over a network). In one or more embodiments, the information corresponding to a refresh entry is the metadata about the resource to which an object corresponds. In one or more embodiments, the cloud information service uses the unique identifiers (which are included in the entries in the cache ring) of the objects to obtain the information from the objects using whatever method of obtaining such information is appropriate for the resource type (e.g., Kubernetes API for objects corresponding to a container deployment, other APIs for objects corresponding to physical resources, etc.). In one or more embodiments, the information from the objects is sent via one or more messages, and used to update the user interface to display the information to the user.

In one or more embodiments, if any updates to objects were added to the cache ring after the second separator entry of the full refresh, but before the full refresh is complete, the cloud information service updates the list of objects to reflect the change to whatever the new version number of the one or more objects that were updated so that the cloud information service is aware of the newest version number in the cache ring corresponding to objects being sent to the user interface as part of the full refresh. In one or more embodiments, the newest version of the object is always sent to the user interface, as the cloud information service does not maintain any history of the state of the object after an object is updated. In one or more embodiments, if another subscription request is received (e.g., from another user using another user interface) that requires a full refresh before the cloud information service sends the object information to the user interface based on the first subscription request that required a full refresh (e.g., in when a user interface disconnects during a full refresh which is later resumed), the cloud information service may start a full refresh (as described above) in response to the subsequent subscription request. However, in that case, in one or more embodiments, the cloud information service will skip the separator entries and the refresh entries of the later full refresh when determining if any changes occurred to objects during the first full refresh.

In one or more embodiments, if a disconnect occurs during a full refresh, when the user interface reconnects, and a new subscription request is received, the new subscription request will include a version number which is the newest version number that the user interface received during the attempted full refresh. In one or more embodiments, in that case, the cloud information service will resume the full refresh by starting with the next version number after the version number received in the new subscription request. In one or more embodiments, the full refresh is complete when all object information for all objects of the resource type to which the cache ring corresponds, including any updates that occurred before the full refresh completes, are sent to the user interface, along with the highest version number in the cache ring of any entry for any object that was sent as part of the full refresh. Additionally, or alternatively, during a full refresh, object information may be sent in a series of messages, with object information from any number of objects in each message. In such embodiments, the highest version number of an object sent in a message is sent to the user interface for each message, even if higher version numbers exist in the cache ring.

In one or more embodiments, after the initial full refresh, if the user remains connected, the subscription is active, and the cloud information service will send any updates to objects that occur (each of which causes a new entry to be added to the cache ring), skipping any entries added to the cache ring as part of a full refresh for another user using another user interface. In one or more embodiments, new entries that are not separator type entries or refresh type entries (which are skipped when providing updates to an active subscription) may be update type entries or delete entries. As discussed above, for any update entry, the cloud information service will obtain the object information, and send the object information to the user interface. In one or more embodiments, for any delete entry, the cloud information service sends a notification to the user interface that the object was deleted. In one or more embodiments, the user interface will update the information for the user in response to any update received from the cloud information service, and modify the information shown in the user interface to reflect any deletions of which the user interface is notified by the cloud information service In one or more embodiments, a user interface may disconnect from the cloud information service for any reason. As an example, the disconnect may be intentional (e.g., the user closes the user interface) or may result from a disruption of the connection between the user interface and the cloud information service (e.g., a network outage). In one or more embodiments, if a user has previously connected to the cloud information service, a subscription request received as part of a reconnect will include the version number that was the highest version number present in the cache ring the last time the user was connected. As an example, if the user interface initially connected, and a full refresh was completed, then the version number will be the highest version number received as part of the full refresh, or of any updates received after the full refresh while the user remained connected to the cloud information service. In one or more embodiments, in response to a subscription request that includes a version number (e.g., for any reconnect after an initial connection), the cloud information service uses the version number to perform a binary search to determine if the version number received in the subscription request is still in the cache ring. In one or more embodiments, the fact that the version of entries added to the cache ring by the cloud information service always increases allows the cloud information service to perform the binary search.

In one or more embodiments, a binary search is performed by starting with the middle entry in the cache ring. In one or more embodiments, if the version number received in the subscription request is equal to the version number of the entry in the middle of the cache ring, then the cloud information service makes a list of all object changes corresponding to entries having a higher version number, which will be entries in the half of the cache ring that have a higher version number than the middle entry, except for the separator entries and refresh entries that may be in the cache ring for a full refresh being performed for another user (which are skipped by the cloud information service). In one or more embodiments, if the version number received in the subscription request is not equal to the version number of the middle entry of the cache ring, the half of the cache in which the version number cannot exist is eliminated from the search, and the search is repeated using the middle element of the half of the cache ring that remains. In one or more embodiments, the binary search continues until an entry having a version number equal to the version number received in the subscription request is found by the cloud information service, or until the cloud information service determines that the version number is no longer in the cache ring. As an example, the cache ring is structured as a ring. Thus, when the number of entries in the cache ring reaches the configured maximum number of entries, the cloud information service returns to the start of the cache ring to add new entries. Therefore, in one or more embodiments, if the period of disconnection was long enough, the version number received in a subscription request may not exist in the cache ring, as it may have been overwritten by newer entries to the cache ring.

In one or more embodiments, if the version number received in the subscription request is found via the binary search, the cloud information service will provide updated object information or notifications of objects deletions for all entries in the cache ring having a higher version number than the version number received in the subscription request, except for entries that are separator entries or refresh entries (which are skipped by the cloud information service). In one or more embodiments, if the version number received in the subscription request is not found via the binary search, then the cloud information service performs a full refresh, as described above, and information for all objects is sent to the user interface from which the subscription request was received.

Certain embodiments of this disclosure may allow any number of user interfaces to receive and maintain current information about resources in a cloud infrastructure without having to be sent all information about the resources each time the user interface connects to a cloud information service seeking the resource information via a subscription request. In one or more embodiments, the amount of information being transmitted to the user interface from the cloud information service is reduced by maintaining a cache ring for each resource type in the cloud infrastructure, where entries in the cache ring include an object identifier, an entry type, and a version number, which allows the cloud information service to only provide information about objects that have been updated or deleted, and only performing a full refresh of all information when a user interface connects to the cloud information service for the first time, or when the version number received in a subscription request as part of a reconnect is no longer in the cache ring.

FIG. 1 illustrates a block diagram of an example system for providing cloud infrastructure information to any number of users in accordance with one or more embodiments disclosed herein. As shown in FIG. 1, the system may include a cloud infrastructure 100. The cloud infrastructure 100 may include cloud resources 102 and a cloud information service 108. The cloud resources may include physical resources 104 and logical resources 106. The system may also include a user 110 and a user interface 112. Each of these components is described below.

In one or more embodiments, the cloud infrastructure 100 is a collection of any number of computing devices and other components in which a cloud computing environment is deployed, and which may host any number of cloud-based applications, as-a-Service (aaS) products (e.g., Software aaS (SaaS), Infrastructure aaS (IaaS), Platform aaS (PaaS), Storage aaS (STaaS), etc.), microservices, container platforms, virtualization environments, infrastructure components, power supplies, racks, enclosures, environment controls, physical spaces, wiring, etc. The cloud infrastructure 100 may include one or more private clouds, public clouds, and/or hybrid clouds. The cloud infrastructure 100 may be located in a single physical location and/or environment, or spread among any number of separate locations and/or environments. The cloud infrastructure 100 may be owned or otherwise maintained by a particular entity, or be provided by any number of separate entities without departing from the scope of embodiments disclosed herein.

In one or more embodiments, the cloud infrastructure 100 includes the cloud resources 102. In one or more embodiments, the cloud resources, as used herein, refer to the portion of the cloud infrastructure 100 that may be used or otherwise accessed by any number of users (e.g., the user 110) of the cloud infrastructure 100. As an example, the cloud resources 102 may include the portion of the cloud infrastructure 100 that are used by users to access aaS offerings, composable infrastructure, virtualization environments, microservices, storage and backup services, database management, etc.

In one or more embodiments, the cloud resources 102 include the physical resources 104. In one or more embodiments, the physical resources 104 include any physical (e.g., hardware) components of the cloud resources, such as, for example, computing devices, network components, storage components, racks, enclosures, etc.

In one or more embodiments, as used herein, a computing device (not shown) may be any single computing device, a set of computing devices, a portion of one or more computing devices, or any other physical or logical grouping of computing resources. In one or more embodiments, a computing device is any device, portion of a device, or any set of devices capable of electronically processing instructions and may include, but is not limited to, any of the following: one or more processors (e.g. components that include circuitry), memory (e.g., random access memory (RAM)), input and output device(s), non-volatile storage hardware (e.g., solid-state drives (SSDs), persistent memory (Pmem) devices, hard disk drives (HDDs)), one or more physical interfaces (e.g., network ports, storage ports), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), an Internet of Things (IoT) device, an array of nodes of computing resources, a supercomputing device, a data center or any portion thereof, and/or any other type of computing device with the aforementioned requirements. In one or more embodiments, any or all the aforementioned examples may be combined to create a system of such devices, or may be partitioned into separate logical devices, which may collectively be referred to as a computing device. Other types of computing devices may be used without departing from the scope of embodiments described herein, such as, for example, the computing device shown in FIG. 5 and described below. The physical resources 104 may include any number and/or type of such computing devices in any arrangement and/or configuration without departing from the scope of embodiments disclosed herein.

In one or more embodiments, the storage and/or memory of a computing device or system of computing devices, or any other component of the physical resources 104, may be and/or include one or more data repositories for storing any number of data structures storing any amount of data (e.g., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any storage and/or memory of a computing device, system of computing devices, or any other component of the physical resources 104 may be considered, in whole or in part, as non-transitory computer readable mediums storing software and/or firmware.

Such software and/or firmware may include instructions which, when executed by the one or more processors (not shown) and/or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods, processes, etc. of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

The physical resources 104 may include any number of computing devices, any number of which may be collectively considered a computing device as used herein. All or any portion of the computing devices may be the same type or be different types of computing devices.

In one or more embodiments, the cloud resources 102 include the logical resources 106. In one or more embodiments, as used herein, the logical resources 106 include any software, firmware, applications, container platforms, virtualization environments, microservices, communication protocols, storage buckets, etc. that execute, at least in part, using the physical resources 104.

As an example, in one or more embodiments, all or any portion of the logical resources 106 may be managed, at least in part, by a container platform (not shown), such as, for example, Kubernetes. In one or more embodiments, a container platform includes a control plane (not shown). A control plane of a container platform may include various components for managing the logical resources (e.g., one or more API servers, controllers, schedulers, etc.). The control plane may, for example, be implemented on one or more master nodes, each of which may be a computing device (discussed above).

In one or more embodiments, the cloud resources 102 may host any number of cloud-based applications as part of the logical resources 106, which may be implemented using a microservice architecture that includes any number of application microservices, as well as various other microservices (e.g., a user interface microservice, any number of common microservices, etc.) and various communication components that allow the various microservices to interact with other microservices, other parts of the cloud resources 102, the cloud infrastructure 100, and/or entities and/or devices outside the cloud infrastructure 100.

In one or more embodiments, a microservice may be implemented using any number of containers, container pods, etc. Each microservice may implement a particular service component that makes up part of an overall cloud-based application deployed as at least a portion of the logical resources 106.

In one or more embodiments, the logical resources 106 may include common microservices, which may be a set of services that are common to all or any portion of the other microservices of the one or more cloud-based applications deployed using a microservice architecture in the cloud infrastructure 100. Examples of common microservices include, but are not limited to, database services, authorization services, workflow orchestration microservices, auditing microservices, management microservices, etc.

In one or more embodiments, the logical resources 106 include various communication components. In one or more embodiments, as used herein, communication components include logical devices and/or components that implement any number of communication protocols that allow communication within the cloud resources 102. As an example, various communication protocols may include, but are not limited to, Representational State Transfer (REST) protocol, remote procedure call (RPC) frameworks (e.g., gRPC), Kafka protocol, etc., as well as other underlying protocols that may be used in communications, such as hypertext transfer protocol (HTTP), transmission control protocol (TCP), user datagram protocol (UDP), etc. Such protocols may be used for communicating data, commands, etc. Communication components of the logical resources 106 may, for example, be implemented, at least in part, using network devices of the physical resources 104.

In one or more embodiments, the logical resources 106 may include any number (e.g., hundreds, thousands, millions) of buckets (e.g., Amazon S3 buckets). A bucket may be a cloud storage container for storing information of any type or amount. The logical resources 106 may include any other types of logical entities (e.g., virtual machines, virtual network devices, virtual storage devices, hypervisors, management software, etc.) without departing from the scope of embodiments disclosed herein.

Although not shown in FIG. 1, in one or more embodiments, each of the physical resources 104 and/or logical resources 106 of the cloud resources 102 in the cloud infrastructure 100 correspond to a data object (which may be stored anywhere in the cloud infrastructure 100) that includes information about the resource.

As an example, a blade server enclosure may have a firmware version, a certain number of components installed that are each in certain state (e.g., on, off, connected to or disconnected from a network, in a degraded state, functioning normally, etc.), any other relevant information related to the enclosure, etc., and the collection of such information about the enclosure may be considered an object. As another example, a cloud-based application may be deployed in a Kubernetes container platform as a set of microservices implemented on a number of container pods, each having any number of containers, and all of the information about that application, or any portion thereof (e.g., the container platform, the microservices, pods, containers, devices on which such things are deployed, etc.), may be considered an object. As another example, a user may have created any number of buckets (e.g., Amazon S3 buckets) for storing information of any type, and information about each of the buckets (e.g., bucket size, space left in bucket, access policy for bucket, etc.) may be considered as objects. Thus, as used herein, an object may refer to metadata about a resource (e.g., an enclosure, a container deployment, a bucket, any physical or logical component, etc.) in the cloud resources 102.

In one or more embodiments, objects may be grouped into resource types. For example, an enclosure resource type may refer to all objects corresponding to enclosures, a container resource type may refer to a collection of objects corresponding to container deployments, a bucket resource type may refer to a collection of objects corresponding to buckets, etc.

In one or more embodiments, the cloud infrastructure 100 includes the cloud information service 108. In one or more embodiments, the cloud information service is any hardware, software, firmware, or any combination thereof that is configured to maintain information about objects (discussed above) corresponding to any of the physical resources 104 and/or logical resources 106 of the cloud resources 102 of the cloud infrastructure 100, and to provide such information to any number of user interfaces (e.g., the user interface 112, discussed below). As an example, the cloud information service 108 may include any number of computing devices (discussed above). As another example, the cloud information service may be implemented as part of a cloud management service executing in a cluster pod of a cluster maintained by an entity managing, at least in part, the cloud infrastructure 100.

In one or more embodiments, a cloud information service is configured to create and maintain a cache ring for each resource type in a cloud infrastructure. There may be any number of cache rings, depending on how many resource types exist in the cloud infrastructure. In one or more embodiments, the cache rings are used to maintain a versioned history of updates to objects corresponding to the physical resources 104 and/or logical resources 106 of the cloud resources 102, and to provide information about the objects to any number of user interfaces. The cache rings maintained by the cloud information service, and the operations of the cloud information service related to maintain the cache rings and providing information to user interfaces is discussed further in the descriptions of FIG. 2, FIG. 3, and FIG. 4, below.

Although FIG. 1 shows the cloud information service 108 as part of the same cloud infrastructure 100 as the cloud resources 102, the cloud information service 108 may alternately be deployed in a separate cloud infrastructure and operatively connected to the cloud infrastructure 100. Additionally, although FIG. 1 shows only a single cloud information service 108, the system may include any number of cloud information services without departing from the scope of embodiments disclosed herein.

In one or more embodiments, the system includes any number of users (e.g., the user 110). In one or more embodiments, the user 110 is any entity (e.g., a human, a software application, etc.) that seeks to access information about any of the cloud resources 102 of the cloud infrastructure 100. In one or more embodiments, information about any of the cloud resources 102 of the cloud infrastructure 100 may be obtained by the user 110 via one or more user interfaces (e.g., the user interface 112). In one or more embodiments, the user interface 112 is any hardware, software, firmware, or any combination thereof that is configured to allow the user 110 to view or otherwise obtain information about all or any portion of the cloud resources 102 of the cloud infrastructure 100. In one or more embodiments, the user interface, at least some of the time, is operatively connected to the cloud information service 108. A given user (e.g., the user 110) may access the user interface 112 (e.g., a Data Services Cloud Console) in which the user 110 may view information about the various resources (e.g., the aforementioned physical resources 104 and/or logical resources 106) that exist in the cloud infrastructure 100. Any number of users using any number of user interfaces may exist that desire to see information about resources in a particular cloud infrastructure.

In one or more embodiments, when the user 110 initiates (e.g., opens, executes, connects to, etc.) the user interface 112 for viewing information about resources in the cloud infrastructure 100 for the first time, a subscription request may be sent to a cloud information service 108 that is operatively connected to the cloud resources 102 in which the physical resources 104 and the logical resources 106 exist. Such subscription requests may also occur each time the user interface 112 reconnects to the cloud information service 108 (e.g., after a disconnect). The user interface 112 may remain subscribed after a subscription request as long as the user interface 112 remains connected to the cloud information service 108. In response to the subscription request, the cloud information service 108 may access information about the cloud resources 102, and provide the information to the user interface 112 in response to the subscription request, and provide updates for as long as the user interface 112 maintains the connection, and, thus, remains subscribed.

While FIG. 1 shows a particular configuration of components, other configurations may be used without departing from the scope of embodiments described herein. For example, although FIG. 1 shows certain components as part of the same device, component, and/or infrastructure, any of the components may be grouped in sets of one or more components which may exist and execute as part of any number of separate and operatively connected devices. As another example, a single component may be configured to perform all, or any portion of the functionality performed by the all or any portion of the components shown in FIG. 1. Accordingly, embodiments disclosed herein should not be limited to the configuration of components shown in FIG. 1.

Figure 2:
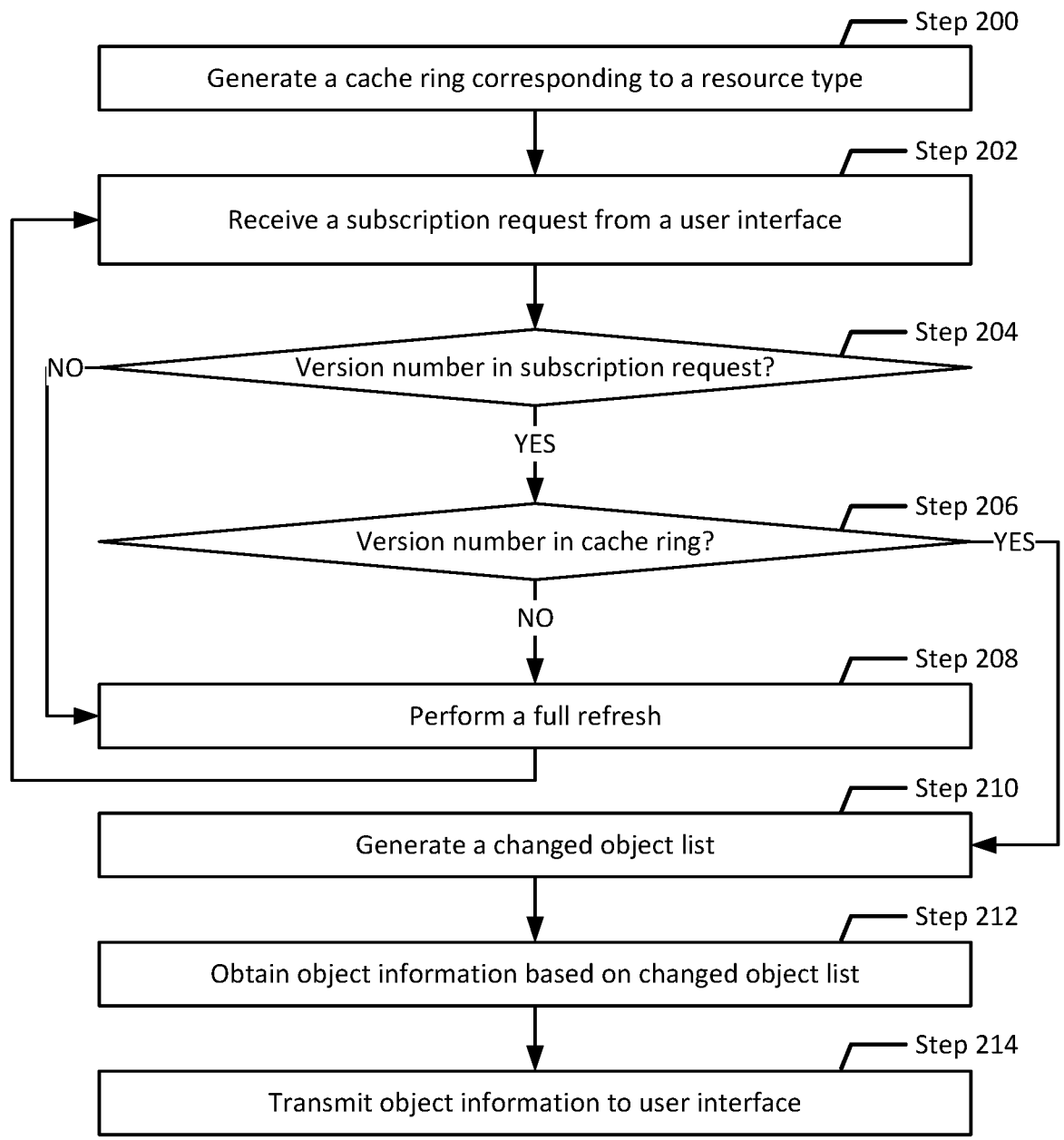
FIG. 2 illustrates an overview of an example method for providing information about cloud resources to user interfaces in accordance with one or more embodiments disclosed herein.

FIG. 2 illustrates an overview of an example method for providing information about cloud resources to user interfaces in accordance with one or more embodiments disclosed herein. All or any portion of the method shown in FIG. 2 may be performed, for example, by a cloud information service (e.g., the cloud information service 108 shown in FIG. 1 and described above).

While the various steps in the flowchart shown in FIG. 2 are presented and described sequentially, some or all of the steps may be executed in different orders, some or all of the steps may be combined or omitted, other steps not shown in FIG. 2 may additionally be performed, and/or some or all of the steps may be executed in parallel with other steps of FIG. 2.

In Step 200, the method includes generating a cache ring corresponding to a resource type. As an example, a cache ring may be generated by a cloud information service (e.g., the cloud information service 108 of FIG. 1). In one or more embodiments, a cloud information service is configured to create and maintain a cache ring for each resource type in a cloud infrastructure. There may be any number of cache rings, depending on how many resource types exist in the cloud infrastructure.

The following description, for the sake of clarity, will focus on one cache ring for one resource type. However, one of ordinary skill in the art will appreciate that the description of a cache ring applies to any number of cache rings for any number of resource types in a cloud infrastructure, and that a cloud information service may use the various cache rings to provide information to a user interface about any number of resource types.

The cache ring may be implemented in memory (e.g., rather than some form of persistent storage). The cache ring may initially have no entries. The cache ring may have entries that are added by the cloud information service as they are received by the cloud information service. The cloud information service may be provided information each time an object corresponding to a resource in a cloud infrastructure is updated. As an example, when the firmware of an enclosure is updated, the object corresponding to the enclosure may be updated to reflect the new firmware version. As another example, when access permissions for a bucket are updated, the object corresponding to the bucket may be updated to reflect the new access policy. As another example, when the number of pods of containers used to implement an application increases, the object corresponding to the container deployment may be updated with the new number of pods. Other updates to the resources may cause updates to corresponding objects without departing from the scope of embodiments disclosed herein.

The cloud information service may receive information about object updates using any manner of receiving information. As an example, the cloud information service may receive information about container deployments via a Kubernetes application programming interface (API) providing information based on a custom resource definition (CRD). As another example, various APIs may exist and be configured to provide information about other resources (e.g., buckets, physical devices, logical components, etc.).

In one or more embodiments, each time the cloud information service is notified that an object has been updated, the cloud information service may add an entry to a cache ring corresponding to a resource type to which the updated object belongs. In one or more embodiments, each such update to an object of the resource type to which the cache ring corresponds causes the cloud information service to add an entry to the cache ring, up to the configured maximum size of the cache ring (e.g., hundreds, thousands, millions, etc. of entries).

In one or more embodiments, each entry added to a cache ring by the cloud information service includes a unique identifier (e.g., a unique name, a universally unique identifier (UUID), etc.) of the object that was updated, and a version data item. The version data item may include an encoding of the type of entry (discussed below), as well as a representation of the version number for the entry. As an example, the version data item may be a thirty-two bit number, in which the first two bits are used to encode one of four possible entry types and the remaining thirty bits are used to encode the integer value of the version number (meaning that the cache ring could have up to 1,073,741,823 entries). In one or more embodiments, each entry added by the cloud information service to a cache ring includes a version number that is increased (e.g., by one) from the previous entry added to the cache ring.

As discussed above, a cache ring corresponds to a resource type, and there may be any number of objects of that resource type (e.g., millions of buckets, each corresponding to separate objects). In one or more embodiments, an update to any object of that resource type causes the cloud information service to add an entry to the appropriate cache ring. However, in one or more embodiments, the version number represents a new entry in the cache ring, and does not correspond to any particular object of the resource type.

As an example, an update to a first object of a particular resource type may cause the cloud information service to add a first entry to the cache ring with an identifier of the first object and a version data item that includes two bits to represent the update type and the remaining bits to represent version one. The cloud information service may then be notified of an update to a second object of the same resource type. In response, the cloud information service may add a second entry to the cache ring with an identifier of the second object and a version data item that encodes the update type and includes a representation of version two. Thus, even though the objects were not the same object, the version number increased as the second entry was added to the cache ring by the cloud information service, so that the second entry has a higher version number than the first entry.

In one or more embodiments, there are four types of entries. In one or more embodiments, the first type of entry is an update. In one or more embodiments, an update is when the information in an object (e.g., metadata corresponding to a resource in a cloud infrastructure) changes. As an example, when the firmware of a network component of an enclosure changes, the object may be changed to reflect a version number of the new firmware. In one or more embodiments, the second type of entry is a deletion. As an example, a resource may be removed from the cloud infrastructure (e.g., a physical device is removed, a container pod is deleted, a bucket is deleted, etc.), and the object corresponding to that resource is deleted.

In one or more embodiments, the remaining two entry types are separator entries and refresh entries. In one or more embodiments, separator and refresh are entry types used whenever a full refresh is performed. In one or more embodiments, a full refresh (discussed further below) is performed whenever a subscription request is received that requires all objects of a resource type corresponding to a cache ring to be provided to the user interface from which the subscription request was received.

In one or more embodiments, though not shown in FIG. 2, the cloud information service may use the cache ring, generated as described above, to service existing subscriptions. In one or more embodiments, any number of users, using any number of user interfaces, may connect to the cloud information service to receive updates about various physical and logical resources of a cloud infrastructure. Such subscriptions may remain active so long as the user interface remains connected to the cloud information service. As discussed above, in one or more embodiments, whenever the cloud information service becomes aware that an update has been made to an object corresponding to a resource of a resource type of a cache ring, the cloud information service updates the cache ring by adding a new entry with an incremented version number, an update type, and a unique name of the object. In one or more embodiments, the cloud information service then determines whether any active subscriptions exist that should receive information from the cache ring. In one or more embodiments, if there are such active subscriptions, the cloud information service may fetch object information for the object that was updated, and send the updated object information to all active subscribers that are to receive updates for the resource type of the cache ring.

In Step 202, the method includes receiving a subscription request from a user interface. As an example, the request may be received by a cloud information service (e.g., the cloud information service 108 of FIG. 1). In one or more embodiments, a subscription request is received whenever the user interface is accessed by the user so that the user may view information about resources of a cloud infrastructure. As such, a subscription request may be received when a user first uses the user interface and connects to a cloud information service, and also each time a user reconnects to the cloud information service after previously disconnecting from the cloud information service.

In Step 204, the method includes making a determination as to whether the subscription request received in Step 202 includes a version number. As an example, the determination may be made by a cloud information service (e.g., the cloud information service 108 of FIG. 1). An initial subscription request may not include a version number. Other scenarios may exist in which a subscription request is received that does not include a version number without departing from the scope of embodiments disclosed herein. In one or more embodiments, subscription requests received from a user interface that has previously connected to the cloud information service will generally include the highest version number in a cache ring that existed at the last time the user interface was connected, which is received by the user interface from the cloud information service each time an update is provide to the user interface from the cache ring (e.g., each time an update of object information is provided while a subscription is active, as discussed above).

In one or more embodiments, if the subscription request does not include a version number, the method proceeds to Step 208. In one or more embodiments, if the subscription request includes a version number, the method proceeds to Step 206.

In Step 206, the method includes making a determination as to whether the version number in the subscription request is a version number in an entry that is presently in the cache ring. As an example, a cloud information service (e.g., the cloud information service 108 of FIG. 1) may make the determination. In one or more embodiments, a user interface may disconnect from the cloud information service for any reason. As an example, the disconnect may be intentional (e.g., the user closes the user interface) or may result from a disruption of the connection between the user interface and the cloud information service (e.g., a network outage).

In one or more embodiments, if a user interface has previously connected to the cloud information service, a subscription request received as part of a reconnect will include the version number that was the highest version number present in the cache ring the last time the user interface was connected. As an example, if the user interface initially connected, and a full refresh was completed, then the version number will be the highest version number received as part of the full refresh, or of any updates received after the full refresh while the user remained connected to the cloud information service.

In one or more embodiments, in response to a subscription request that includes a version number (e.g., for any reconnect after an initial connection), the cloud information service uses the version number to perform a binary search to determine if the version number received in the subscription request is still in the cache ring. In one or more embodiments, the fact that the version of entries added to the cache ring by the cloud information service always increases allows the cloud information service to perform the binary search.

In one or more embodiments, a binary search is performed by starting with the middle entry in the cache ring. In one or more embodiments, if the version number received in the subscription request is not equal to the version number of the middle entry of the cache ring, the half of the cache in which the version number cannot exist is eliminated from the search, and the search is repeated using the middle element of the half of the cache ring that remains. In one or more embodiments, the binary search continues until an entry having a version number equal to the version number received in the subscription request is found by the cloud information service, or until the cloud information service determines that the version number is no longer in the cache ring. As an example, the cache ring is structured as a ring. Thus, when the number of entries in the cache ring reaches the configured maximum number of entries, the cloud information service returns to the start of the cache ring to add new entries. Therefore, in one or more embodiments, if the period of disconnection was long enough, the version number received in a subscription request may not exist in the cache ring, as it may have been overwritten by newer entries to the cache ring.

In one or more embodiments, if the version number in the subscription request is found in the cache ring, the method proceeds to Step 210. In one or more embodiments, if the version number in the subscription request is not found in the cache ring, the method proceeds to Step 208.

In Step 208, the method includes performing a full refresh. As an example, the full refresh may be performed by a cloud information service (e.g., the cloud information service 108 of FIG. 1). In one or more embodiments, a full refresh is performed when it is determined that a received subscription request does not include a version number (as determined in Step 204), or includes a version number that is no longer present in the cache ring (as determined in Step 206).

In one or more embodiments, to perform a full refresh, the cloud information service creates a list of all objects of the resource type to which the cache ring corresponds. In one or more embodiments, the list of all objects is a list of objects corresponding to a resource currently present in the cloud infrastructure (e.g., the list does not include objects that were deleted before that full refresh was started). In one or more embodiments, the cloud information service then adds an entry to the cache ring with a separator version type, then entries for all objects of the resource type to which the cache ring corresponds, with each such entry having a refresh entry type, and then another entry with a separator entry type, with the first separator entry, each of the refresh entries, and the second separator entry each having an increasing version number.

In one or more embodiments, the cloud information service then checks to determine whether any updates to any objects have occurred during the time the object list was being created and the separator and refresh entries were being added to the cache ring. In one or more embodiments, if there were no updates that occurred during that time, the cloud information service sends information corresponding to each refresh entry to the user interface in one or more messages of any type (e.g., data packets over a network).

In one or more embodiments, the information corresponding to a refresh entry is the metadata about the resource to which an object corresponds. In one or more embodiments, the cloud information service uses the unique identifiers (which are included in the entries in the cache ring) of the objects to obtain the information from the objects using whatever method of obtaining such information is appropriate for the resource type (e.g., Kubernetes API for objects corresponding to a container deployment, other APIs for objects corresponding to physical resources, etc.). In one or more embodiments, the information from the objects is sent to the user interface via one or more messages of any type, and used to update the user interface to display the information to the user.

In one or more embodiments, if any updates to objects were added to the cache ring after the second separator entry of the full refresh, but before the full refresh is complete, the cloud information service updates the list of objects to reflect the change to whatever the new version number of the one or more objects that were updated so that the cloud information service is aware of the newest version number in the cache ring corresponding to objects being sent to the user interface as part of the full refresh. In one or more embodiments, the newest version of the object is always sent to the user interface, as the cloud information service does not maintain any history of the state of the object after an object is updated.

In one or more embodiments, if another subscription request is received (e.g., from another user using another user interface) that requires a full refresh before the cloud information service sends the object information to the user interface based on the first subscription request that required a full refresh, the cloud information service may start a full refresh (as described above) in response to the subsequent subscription request. However, in that case, in one or more embodiments, the cloud information service will skip the separator entries and the refresh entries of the later full refresh when determining if any changes occurred to objects during the first full refresh.

In one or more embodiments, if a disconnect occurs during a full refresh, when the user interface reconnects, and a new subscription request is received, the new subscription request will include a version number which is the newest version number that the user interface received during the attempted full refresh. In one or more embodiments, in that case, the cloud information service will resume the full refresh by starting with the next version number after the version number received in the new subscription request. In one or more embodiments, the full refresh is complete when all object information for all objects of the resource type to which the cache ring corresponds, including any updates that occurred before the full refresh completes, are sent to the user interface, along with the highest version number in the cache ring of any entry for any object that was sent as part of the full refresh. In one or more embodiments, after a full refresh, the cloud information service will continue to provide updates to object information and notifications of object deletions, based on the entries added to the cache ring, for as long as the user interface remains connected to the cloud information service. In one or more embodiments, if the user interface is disconnected from the cloud information service sometime in the future for any reason, and the user interface reconnects to the cloud information service sometime after the disconnection, the method returns to Step 202 when the subscription request is received at the time of reconnection.

In Step 210, the method includes generating a changed object list. As an example, a changed object list may be generated by a cloud information service (e.g., the cloud information service 108 of FIG. 1). In one or more embodiments, if the version number received in the subscription request is equal to the version number of the entry in the middle of the cache ring (e.g., at the start of the binary search described above), then the cloud information service makes a list of all object changes corresponding to entries having a higher version number, which will be entries in the half of the cache ring that have a higher version number than the middle entry, except for the separator entries and refresh entries that may be in the cache ring for a full refresh being performed for another user (which are skipped by the cloud information service). Thus, the changed object list may include entries that include the update entry type, and the deleted entry type.

In one or more embodiments, if the version number received in the subscription request is found via the binary search at any other point, the cloud information service will add to the changed object list all objects corresponding to entries in the cache ring having a higher version number than the version number received in the subscription request, except for entries that are separator entries or refresh entries (which are skipped by the cloud information service).

In Step 212, the method includes obtaining object information based on the changed object list. As an example, the object information may be obtained by a cloud information service (e.g., the cloud information service 108 of FIG. 1). In one or more embodiments, the cloud information service uses the unique identifiers (which are included in the entries in the cache ring) of the objects to obtain the information from the objects using whatever method of obtaining such information is appropriate for the resource type (e.g., Kubernetes API for objects corresponding to a container deployment, other APIs for objects corresponding to physical resources, etc.).

In Step 214, the method includes transmitting the object information obtained in Step 212 to the user interface. In one or more embodiments, transmitting the updated object information includes sending the object information for any objects corresponding to an update entry type in the cache ring, and notification of object deletions corresponding to entries in the cache ring with a deleted entry type, for all entries in the cache ring having a higher version number than that which was received as part of the subscription request. As an example, the object information may be transmitted to the user interface from a cloud information service (e.g., the cloud information service 108 of FIG. 1) using any technique for transmitting information (e.g., as messages in data packets over a network).

Figure 3:
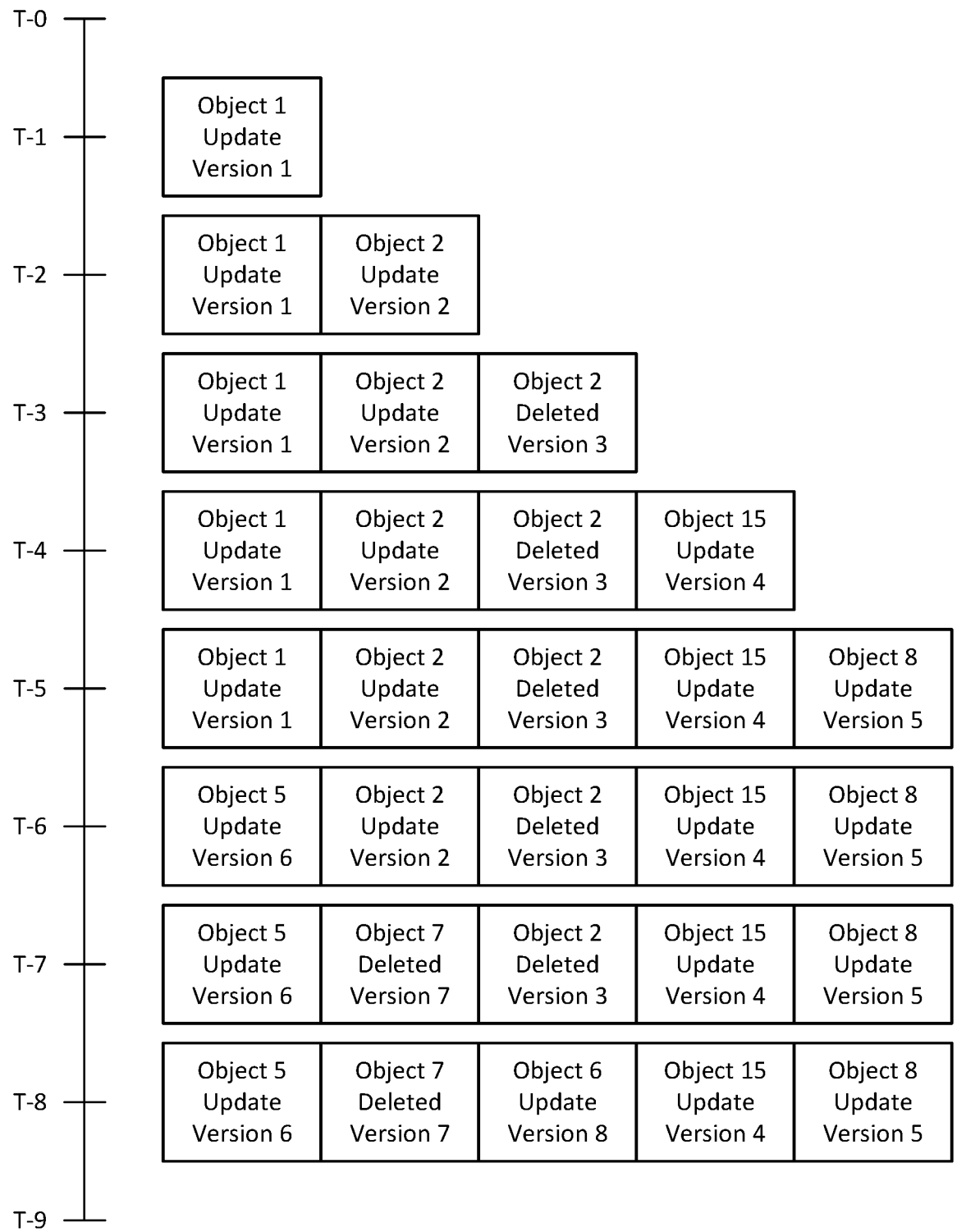
FIG. 3 illustrates an example scenario for generating a cache ring, and providing updates from the cache ring in response to a subscription request having a version number, in accordance with one or more embodiments disclosed herein.

FIG. 3 illustrates an example scenario for generating a cache ring, and providing updates from the cache ring in response to a subscription request having a version number, in accordance with one or more embodiments of this disclosure. The example shown in FIG. 3 and discussed below is a highly simplified example intended for explanatory purposes only, and not intended to limit the scope of embodiments described herein. One of ordinary skill in the art, having the benefit of this disclosure, will appreciate that such a scenario may include a much larger size cache ring, many more objects corresponding to objects in the cache ring, etc. than what is shown in FIG. 3. Additionally, while the example shows certain aspects of embodiments disclosed herein, all possible aspects of such embodiments may not be illustrated in this particular example.

Consider a scenario in which a cloud information service is configured to generate and maintain a cache ring with a size allowing for five entries. The cache ring corresponds to a particular resource type (e.g., buckets) in a cloud infrastructure. There are at least fifteen resources of the resource type, and each resource has a corresponding object that includes metadata related to the object, which is updated from time to time.

As shown in FIG. 3, at a time T-0, the cache ring has no entries, as there have, at that time, been no updates to objects corresponding to resources of the resource type for which the cache ring exists. The generation of the cache ring will begin when the cloud information service begins to receive updates to objects corresponding to resources of the resource type to which the cache ring corresponds.

At time T-1, the cloud information service is notified that an object is updated. Thus, the cloud information service adds an entry to the cache ring, with a unique identifier of the object, Object 1, the update type "Update", and a version number, Version 1.

At this point, and at all subsequent points in the Example shown in FIG. 3 at which an entry is added to the cache ring, the cloud information service may determine if any user interfaces are actively subscribed to receive updates about the resources of the resource type to which the cache ring corresponds. If there are active subscriptions, the cloud information service will provide the updates to the subscribed user interfaces, which will either be the object information fetched by the cloud information service, or notification that an object was deleted. The fact that that happens will not be repeated in this example for the sake of clarity. Additionally, this scenario does not include any subscription request that requires a full refresh, for the sake of clarity. An example that includes a full refresh may be found below, in the description of FIG. 5.

Sometime later, at time T-2, the cloud information service receives a notification of an update to an Object 2, and adds an entry to the cache ring that include Object 1, the entry type "Update", and a version number "Version 2".

At time T-3, the cloud information service receives a notification of a deletion of Object 2, and adds an entry to the cache ring that include Object 1, the entry type "Deleted", and a version number "Version 3".

At time T-4, the cloud information service receives a notification of an update to an Object 15, and adds an entry to the cache ring that include Object 15, the entry type "Update", and a version number "Version 4".

At time T-5, the cloud information service receives a notification of an update to an Object 8, and adds an entry to the cache ring that include Object 8, the entry type "Update", and a version number "Version 5".

At this point, the cache ring has five entries, and thus is full. Therefore, the next update received by the cloud information service will overwrite the first entry in the cache ring.

At time T-6, the cloud information service receives a notification of an update to an Object 5, and adds an entry to the cache ring that include Object 5, the entry type "Update", and a version number "Version 5", overwriting the previous first entry in the cache ring.

At time T-7, the cloud information service receives a notification of a deletion of an Object 7, and adds an entry to the cache ring that include Object 7, the entry type "Deleted", and a version number "Version 7", overwriting the previous second entry in the cache ring.

At time T-8, the cloud information service receives a notification of an update to an Object 6, and adds an entry to the cache ring that include Object 6, the entry type "Update", and a version number "Version 8", overwriting the previous third entry in the cache ring.

At time T-9, the cloud information service receives a subscription request from a user interface. The subscription request includes a version number 4. The cloud information service then performs a binary search (described above in the description of FIG. 2), and determines that version 4 is still in the cache ring. Based on the determination, the cloud information service generates a changed object list based on all entries in the cache ring with a version number higher than version 4. Thus, the changed object list includes the update of object 8 at the entry version 5, the update of object 5 at the entry version 6, the deletion of object 7 at the entry version 7, and the update of object 6 at the entry version 8. Based on the changed object list, the cloud information service fetches object information for object 8, object 5, and object 6. The cloud information service then prepares a message for the user interface from which the subscription request was received and sends the message to the user interface. The message includes the updated object information for object 8, object 5, and object 6, and a notification of the deletion of object 7.

Figure 4:
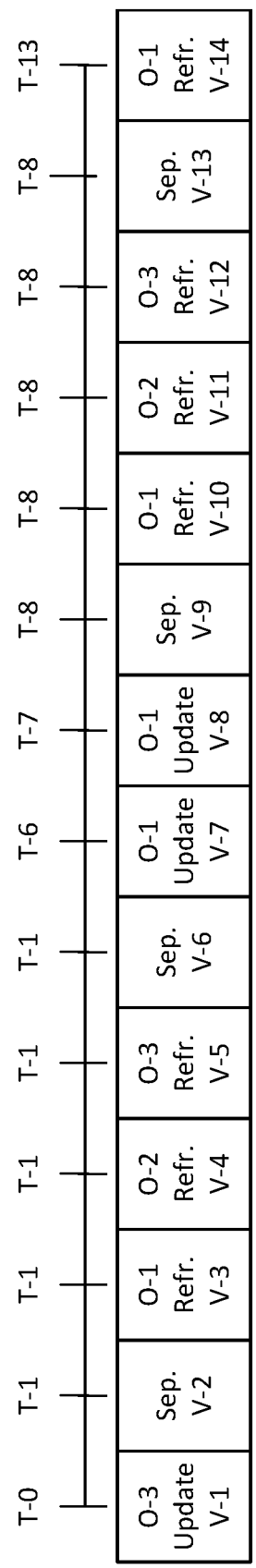
FIG. 4 illustrates an example scenario for providing updates from a cache ring in response to two subscription requests, one that has no version number, and one that has a version number not found in the cache ring, in accordance with one or more embodiments disclosed herein.

FIG. 4 illustrates an example scenario for providing updates from a cache ring in response to two subscription requests, one that has no version number, and one that has a version number not found in the cache ring, in accordance with one or more embodiments of this disclosure. The example shown in FIG. 4 and discussed below is a highly simplified example intended for explanatory purposes only, and not intended to limit the scope of embodiments described herein. One of ordinary skill in the art, having the benefit of this disclosure, will appreciate that such a scenario may include a much larger size cache ring, many more objects corresponding to objects in the cache ring, etc. than what is shown in FIG. 4. Additionally, while the example shows certain aspects of embodiments disclosed herein, all possible aspects of such embodiments may not be illustrated in this particular example.

Consider a scenario in which a cache ring has been generated and is being maintained by a cloud information service. The cache ring corresponds to a resource type of which three resources exist in a cloud infrastructure. Thus, there are three objects corresponding to the three resources that include metadata about the resources.

At time T-0, the cloud information service is notified that an object is updated. Thus, the cloud information service adds an entry to the cache ring, with a unique identifier of the object, O-3, the update type "Update", and a version number, V-1.

At this point, and at all subsequent points in the Example shown in FIG. 4 at which an entry is added to the cache ring that is not a "Sep." (meaning Separator) or "Refr." (meaning Refresh) entry type, the cloud information service may determine if any user interfaces are actively subscribed to receive updates about the resources of the resource type to which the cache ring corresponds. If there are active subscriptions, the cloud information service will provide the updates to the subscribed user interfaces, which will either be the object information fetched by the cloud information service, or notification that an object was deleted. The fact that that happens will not be repeated in this example for the sake of clarity.

After T-0, the cloud information service receives a subscription request that does not include a version number. Therefore, the cloud information service performs a full refresh. The full refresh begins at time T-1, where the cloud information service adds an entry to the cache ring with a Separator entry type, shown as "Sep." in FIG. 4, and a version number V-2. The cloud information service then makes a list of all objects of the resource type corresponding to the cache ring, which are objects O-1, O-2, and O-3. The cloud information service then adds an entry to the cache ring for each of the objects, each of which have a refresh entry shown in FIG. 4 as "Refr.", and have versions V-3, V-4, and V-5. The cloud information service then adds another Sep. entry to the cache ring with a version V-6. In FIG. 4, each of the Sep. and Refr. entries for the first full refresh are shown corresponding to a timestamp T-1, as the separator and refresh entries are generally added at substantially the same time. While the full refresh is being performed, O-1 is updated twice, as shown by two more entries in the cache ring, V-7 and V-8. Therefore, the cloud information service updates the list of objects to include O-1 with V-8 instead of V-3.

Also during the full refresh, another user interface sends a subscription request that includes a version number 0. The cloud information service determines that there is no longer any entry in the cache ring with V-0, and thus another full refresh must be performed for the second user interface. Accordingly, the cloud information service adds entries V-9 through V-13 to the cache ring, which includes a Sep. entry, three Refr. entries for the three objects, and a second Sep. entry. Each of these entries is shown in FIG. 4 as corresponding to a timestamp T-8, as the separator and refresh entries are generally added at substantially the same time. When the cloud information service is determining if any updates occurred to the objects during the first full refresh (V-3 through V-6), the cloud information service skips the Sep. and Ref. entries for the second full refresh.

The cloud information service completes the first full refresh by fetching object information for O-1, O-2, and O-3 and sends the object information as part of a message that includes V-8. The cloud information service completes the second full refresh with object information for the three objects and version V-13.

Before the second refresh completes, the user interface that needed the first full refresh is disconnected from the cloud information service due to a network error. The user interface then reconnects to the cloud information service after the cloud information service has added the V-14 entry for an update to O-1. The subscription request for the reconnection includes V-8, which was received when the user interface received the first full refresh. The cloud information service used V-8 to perform a binary search on the cache ring. The cloud information service finds V-8, skips V-9-V-13 because they are Sep. and Refr. entries, and fetches the object information for O-1. The cloud information service then sends the object information to the user interface along with the version number V-14.

Figure 5:
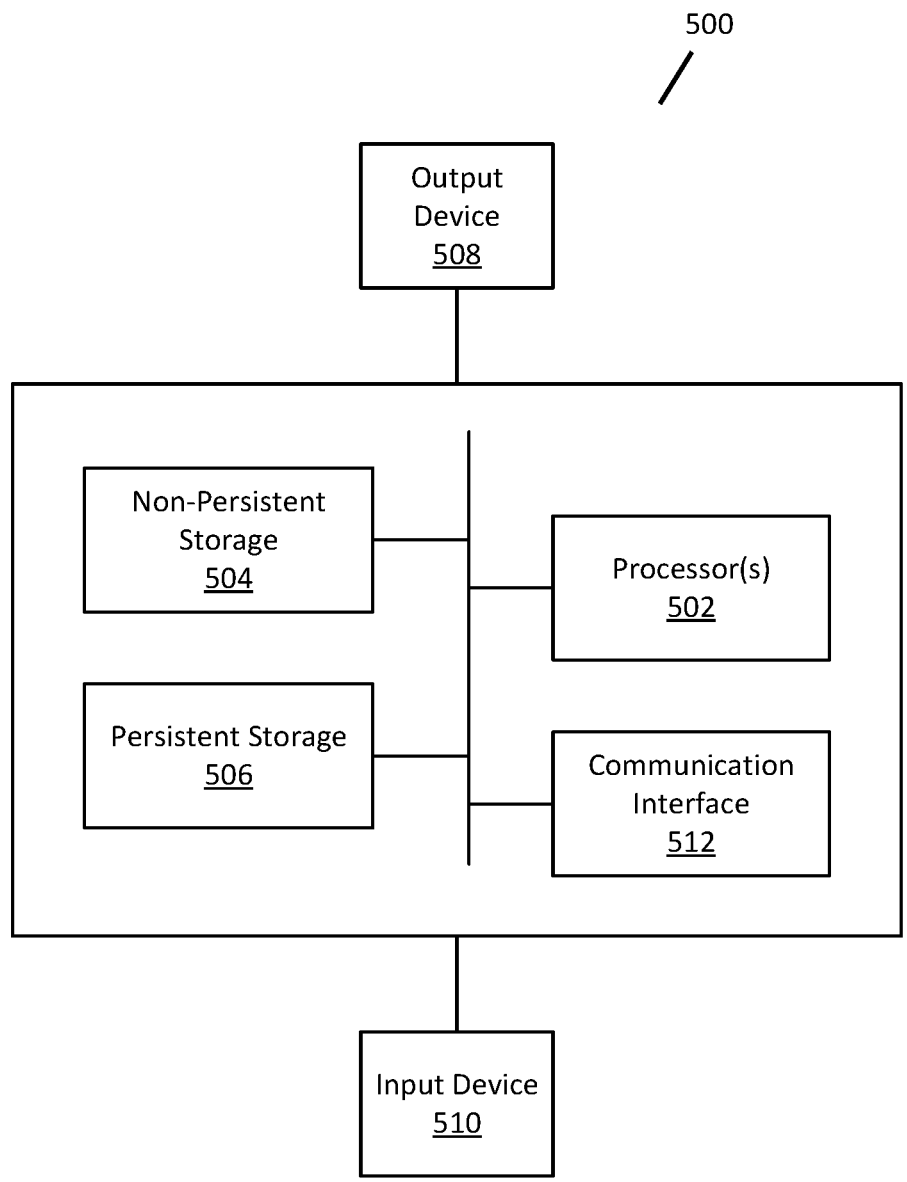
FIG. 5 illustrates a block diagram of a computing device, in accordance with one or more embodiments of this disclosure.

FIG. 5 illustrates a block diagram of a computing device, in accordance with one or more embodiments of this disclosure. As discussed above, embodiments described herein may be implemented using computing devices. For example, the all or any portion of the components shown in FIG. 1 may be implemented, at least in part, using one or more computing devices, and all or any portion of the method shown in FIG. 2 may be performed using one or more computing devices, such as the computing device 500. The computing device 500 may include one or more computer processors 502, non-persistent storage 504 (e.g., volatile memory, such as random access memory (RAM), cache memory, etc.), persistent storage 506 (e.g., a hard disk, an optical drive such as a compact disk (CD) drive or digital versatile disk (DVD) drive, a flash memory, etc.), a communication interface 512 (e.g., Bluetooth interface, infrared interface, network interface, optical interface, etc.), input devices 510, output devices 508, and numerous other elements (not shown) and functionalities. Each of these components is described below.

In one or more embodiments, the computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. The processor 502 may be an application specific integrated circuit (ASIC), a graphics processing unit (GPU), a data processing unit (DPU), a tensor processing units (TPU), an associative processing unit (APU), a vision processing units (VPU), a quantum processing units (QPU), and/or various other processing units that use special purpose hardware (e.g., field programmable gate arrays (FPGAs), System-on-a-Chips (SOCs), digital signal processors (DSPs), etc.), etc. Although only one processor 502 is shown in FIG. 4, the computing device 500 may include any number of processors without departing from the scope of embodiments disclosed herein.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. In one or more embodiments, the computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multimodal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples of embodiments described herein. It will be understood by those skilled in the art (who also have the benefit of this disclosure) that one or more embodiments described herein may be practiced without these specific details, and that numerous variations or modifications may be possible without departing from the scope of the embodiments described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects of embodiments disclosed herein.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various embodiments described herein, may be equivalent to one or more same or similarly named and/or numbered components described with regard to any other figure. For brevity, descriptions of these components may not be repeated with regard to each figure. Thus, each and every embodiment of the components of each figure is incorporated by reference and assumed to be optionally present within every other figure having one or more same or similarly named and/or numbered components. Additionally, in accordance with various embodiments described herein, any description of the components of a figure is to be interpreted as an optional embodiment, which may be implemented in addition to, in conjunction with, or in place of the embodiments described with regard to a corresponding one or more same or similarly named and/or numbered component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments discussed herein have been described with respect to a limited number of embodiments, those skilled in the art, having the benefit of this disclosure, will appreciate that other embodiments can be devised which do not depart from the scope of embodiments as disclosed herein. Accordingly, the scope of embodiments described herein should be limited only by the attached claims.

What is claimed is:

1. An apparatus, comprising:
    one or more processors; and
    one or more non-transitory computer readable media storing instructions which, when executed by the one or more processors, cause the one or more processors to:
        generate, by a cloud information service executing on the one or more processors, a cache ring corresponding to a resource type of a plurality of resource types of a cloud infrastructure and comprising a plurality of entries that each correspond to one object of a plurality of objects, wherein each object of the plurality of objects corresponds to a respective resource of the resource type in the cloud infrastructure;
        receive, from a user interface and at the cloud information service, a subscription request, wherein the subscription request comprises a version number corresponding to a highest version number present in the cache ring during a previous connection between the user interface and the cloud information service;
        perform, by the cloud information service, a search on the cache ring using the version number to determine whether any entry of the plurality of entries in the cache ring comprises the version number, wherein a particular entry of the plurality of entries including the version number indicates that the particular entry was previously transmitted from the cloud information service to the user interface;
        generate, when the version number is in the cache ring, a changed object list, wherein:
            the changed object list comprises plurality of object identifiers corresponding to a first set of entries within the plurality of entries in the cache ring having an update entry type or a delete entry type, and
            each entry of the first set of entries comprises a respective higher version number that is numerically higher than the version number;
        obtain, based on the plurality of object identifiers in the changed object list, object information for a first plurality of objects corresponding to a portion of the first set of entries that have the update entry type; and
        transmit to the user interface the object information for the first plurality of objects and a notification of deletion of a second plurality of objects corresponding to a second portion of the first set of entries that have the delete entry type.

2. The apparatus of claim 1, wherein the execution of the instructions further causes the one or more processors to:
    receive, from a second user interface, a second subscription request that does not include any version number; and
    perform, in response to the second subscription request, a full refresh.

3. The apparatus of claim 1, wherein the execution of the instructions further causes the one or more processors to:
    receive, from a second user interface, a second subscription request that includes a second version number;
    perform a second search on the cache ring using the second version number to determine whether any entry of the plurality of entries in the cache ring comprises the second version number; and
    perform, when the second search determines that the second version number is not in the cache ring, a full refresh.

4. The apparatus of claim 1, wherein the resource type is a container resource type, a bucket resource type, or an enclosure resource type.

5. The apparatus of claim 1, wherein each of the plurality of entries in the cache ring comprises a unique object identifier, an entry type, and a unique version number.

6. The apparatus of claim 1, wherein the search is a binary search.

7. The apparatus of claim 1, wherein the cloud information service skips, while generating the changed object list, a second set of entries within the plurality of entries in the cache ring having a separator entry type or a refresh entry type.

8. A computer-implemented method, comprising:
    generating, by a cloud information service executing on one or more processors, a cache ring corresponding to a resource type of a plurality of resource types of a cloud infrastructure and comprising a plurality of entries that each correspond to one object of a plurality of objects, wherein each object of the plurality of objects corresponds to a respective resource of the resource type in the cloud infrastructure;
    receiving, from a user interface and at the cloud information service, a subscription request, wherein the subscription request comprises a version number corresponding to a highest version number present in the cache ring during a previous connection between the user interface and the cloud information service;
    performing, by the cloud information service, a search on the cache ring using the version number to determine whether any entry of the plurality of entries in the cache ring comprises the version number, wherein a particular entry of the plurality of entries including the version number indicates that the particular entry was previously transmitted from the cloud information service to the user interface;

generating, when the version number is in the cache ring, a changed object list, wherein:

the changed object list comprises plurality of object identifiers corresponding to a first set of entries within the plurality of entries in the cache ring having an update entry type or a delete entry type, and each entry of the first set of entries comprises a respective higher version number that is numerically higher than the version number;

obtaining, based on the plurality of object identifiers in the changed object list, object information for a first plurality of objects corresponding to a portion of the first set of entries that have the update entry type; and transmitting to the user interface the object information for the first plurality of objects and a notification of deletion of a second plurality of objects corresponding to a second portion of the first set of entries that have the delete entry type.

9. The computer-implemented method of claim 8, further comprising:

receiving, from a second user interface, a second subscription request that does not include any version number; and performing, in response to the second subscription request, a full refresh.

10. The computer-implemented method of claim 8, further comprising:

receiving, from a second user interface, a second subscription request that includes a second version number;

performing a second search on the cache ring using the second version number to determine whether any entry of the plurality of entries in the cache ring comprises the second version number; and performing, when the second search determines that the second version number is not in the cache ring, a full refresh.

11. The computer-implemented method of claim 8, wherein the resource type is a container resource type, a bucket resource type, or an enclosure resource type.

12. The computer-implemented method of claim 8, wherein each of the plurality of entries in the cache ring comprises a unique object identifier, an entry type, and a unique version number.

13. The computer-implemented method of claim 8, wherein the search is a binary search.

14. The computer-implemented method of claim 8, wherein the cloud information service skips, while generating the changed object list, a second set of entries within the plurality of entries in the cache ring having a separator entry type or a refresh entry type.

15. A non-transitory computer-readable medium storing programming for execution by one or more processors, the programming comprising instructions to:

generate, by a cloud information service executing on the one or more processors, a cache ring corresponding to a resource type of a plurality of resource types of a cloud infrastructure and comprising a plurality of entries that each correspond to one object of a plurality of objects, wherein each object of the plurality of objects corresponds to a respective resource of the resource type in the cloud infrastructure;

receive, from a user interface and at the cloud information service, a subscription request, wherein the subscription request comprises a version number corresponding to a highest version number present in the cache ring during a previous connection between the user interface and the cloud information service;

perform, by the cloud information service, a search on the cache ring using the version number to determine whether any entry of the plurality of entries in the cache ring comprises the version number, wherein a particular entry of the plurality of entries including the version number indicates that the particular entry was previously transmitted from the cloud information service to the user interface;

generate, when the version number is in the cache ring, a changed object list, wherein:

the changed object list comprises plurality of object identifiers corresponding to a first set of entries within the plurality of entries in the cache ring having an update entry type or a delete entry type, and each entry of the first set of entries comprises a respective higher version number that is numerically higher than the version number;

obtain, based on the plurality of object identifiers in the changed object list, object information for a first plurality of objects corresponding to a portion of the first set of entries that have the update entry type; and transmit to the user interface the object information for the first plurality of objects and a notification of deletion of a second plurality of objects corresponding to a second portion of the first set of entries that have the delete entry type.

16. The non-transitory computer-readable medium of claim 15, comprising further instructions that, when executed by the one or more processors, cause the one or more processors to:

receive, from a second user interface, a second subscription request that does not include any version number; and perform, in response to the second subscription request, a full refresh.

17. The non-transitory computer-readable medium of claim 15, comprising further instructions that, when executed by the one or more processors, cause the one or more processors to:

receive, from a second user interface, a second subscription request that includes a second version number;

perform a second search on the cache ring using the second version number to determine whether any entry of the plurality of entries in the cache ring comprises the second version number; and perform, when the second search determines that the second version number is not in the cache ring, a full refresh.

18. The non-transitory computer-readable medium of claim 15, wherein the resource type is a container resource type, a bucket resource type, or an enclosure resource type.

19. The non-transitory computer-readable medium of claim 15, wherein each of the plurality of entries in the cache ring comprises a unique object identifier, an entry type, and a unique version number.

20. The non-transitory computer-readable medium of claim 15, wherein the cloud information service skips, while generating the changed object list, a second set of entries within the plurality of entries in the cache ring having a separator entry type or a refresh entry type.

\* \* \* \* \*